Sept. 25, 1956 R. M. WALKER ET AL 2,764,680
ELECTRON TUBE LIMITER CIRCUIT
Filed Jan. 10, 1946
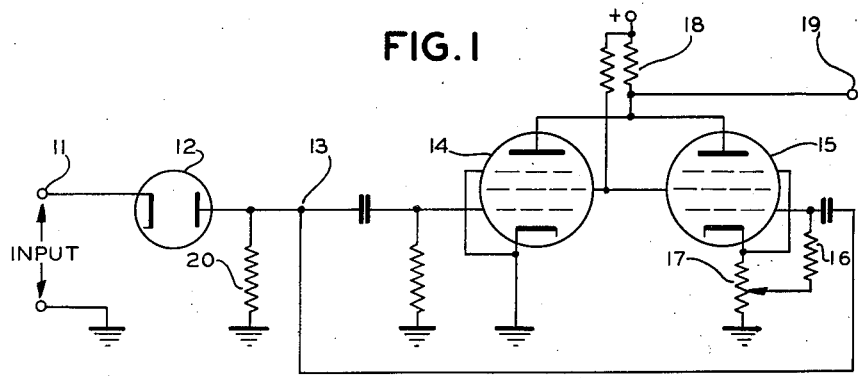
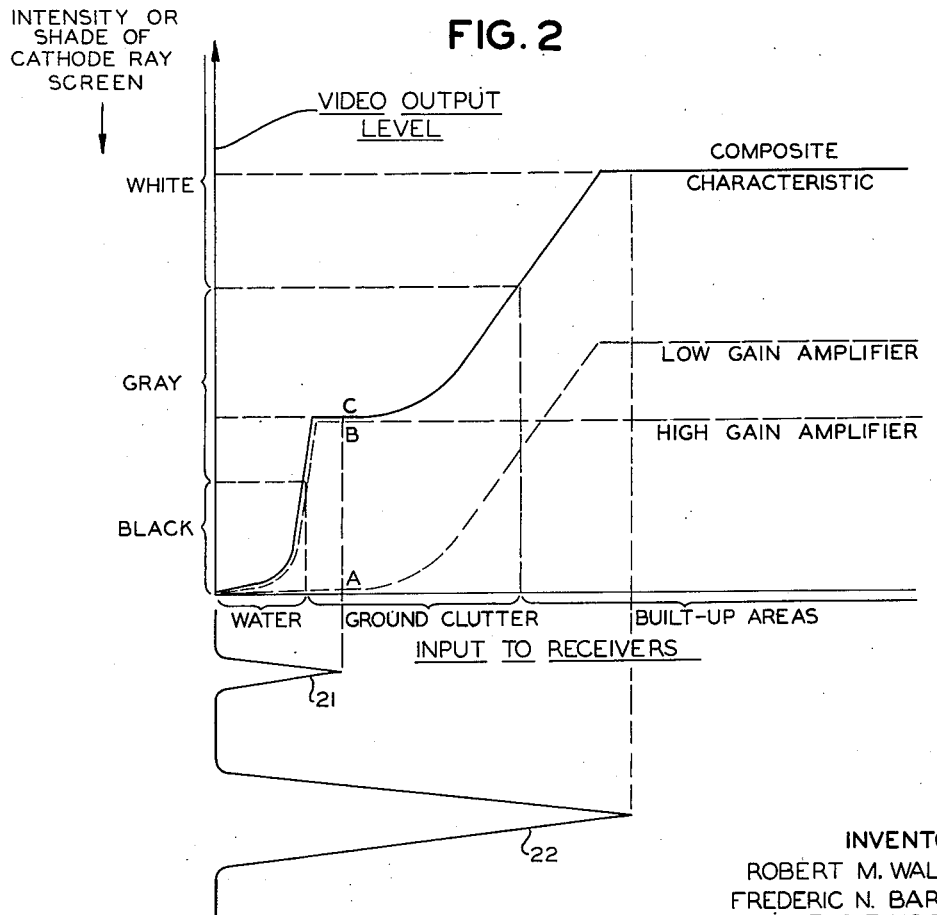
INVENTORS
ROBERT M. WALKER
FREDERIC N. BARRY
WALTERS E. HOGUE
BY
ATTORNEY

United States Patent Office 2,764,680
Patented Sept. 25, 1956

2,764,680
ELECTRON TUBE LIMITER CIRCUIT

Robert M. Walker, Cambridge, and Frederic N. Barry, Belmont, Mass., and Walters E. Hogue, Hollywood, Calif., assignors, by mesne assignments, to the United States of America as represented by the Secretary of the Navy Application January 10, 1946, Serial No. 640,276

2 Claims. (Cl. 250—27)

This invention relates to a circuit which will improve target contrast on an intensity modulated cathode ray tube, and particularly on such cathode ray tubes as are employed in radar PPI (Plan Position Indicator) presentations.

Radar detection is made possible by the return of reflected energy. The amount of this reflected energy is a function of the nature of the target surface and of the material composition of the target. This indicates that the amplitude of the detected signals will vary over a wide range. Since persistent screens have been commonly used in radar presentation, the usual practice has been to cause the receiver to limit at a voltage value which when impressed on an electrode of the cathode ray tube would neither damage the constituents of the persistent screen nor cause blooming (a defocusing effect which enlarges target image). It has been the custom to adjust the receiver so that the voltage amplitude at which limiting occurs has corresponded to a signal strength of value corresponding to the reflected energy from ordinary land areas. It is readily evident that this practice eliminates entirely the possibility of any contrast between ordinary land areas and populated or settled areas, which would in general yield an appreciably greater signal strength of the echo return, unless the gain of the receiver is reduced when, perforce, strong signals will stand out. Reduction of gain, however, leaves only isolated targets on the scope and destroys the mapping ability of the scope. This fact, coupled with the fact that the eye is not capable of distinguishing between close shades of gray, strongly indicates the need for some method of initiating target contrast in the radar presentation.

Accordingly, it is an object of this invention to provide a circuit which will have two levels of limiting.

Another object of this invention is to provide an auxiliary circuit which when incorporated in a radar system will provide a three-tone presentation on the screen of an intensity modulated cathode ray tube.

Another object is to provide an auxiliary circuit which in conjunction with a single receiver will have a gain characteristic and limiting output level which will depend on the strength of the input signal to the auxiliary circuit.

Another object of this invention is to provide means for a better discrimination of radar targets.

These and further objects will be apparent upon consideration of the following description together with the accompanying drawings, in which:

Fig. 1 is a circuit diagram of an embodiment of this invention; and

Fig. 2 shows a graph of certain operating characteristics of the embodiment disclosed in Fig. 1.

In Fig. 1 an input signal, which must be taken from the radar receiver at a point ahead of the limiting stage, is impressed on terminal 11. Diode 12 is really a detector which would ordinarily be a part of the receiver feeding signals to this invention. Resistor 20 is the load resistor of diode 12 and the detector is so arranged that only negative signals appear at junction point 13. The voltage at point 13 is impressed on the control grid of high gain amplifier 14 and also on the control grid of low gain amplifier 15 through suitable coupling condensers. The suppressor grids of the amplifiers are returned to their respective cathodes, and the screens are returned to a positive source of voltage through a suitable resistor. Amplifier 15 has an adjustable return point for its grid resistor 16 in order that the point at which amplifier 15 cuts off and consequently the degree of scope intensity resulting from the output of amplifier 15 may be controlled. The resistance strip of variable resistor 17 forms an ordinary degenerative cathode impedance used to give amplifier 15 its low gain characteristic. The outputs of amplifiers 14 and 15 are combined by the use of a common plate load resistor 18, and the combned output is available at terminal 19. The disclosed circuit is thus seen to comprise a circuit of a low gain amplifier in parallel with a high gain amplifier, the outputs of both being combined in a common load impedance for connection to a suitable intensity modulated cathode ray tube.

The action of this embodiment is best described by reference to Fig. 2, which shows the characteristics of both amplifiers individually and collectively and typical target echo strengths. An ordinary land and a city region will be assumed. Ordinary land echo 21 will be of less amplitude than city echo 22. Land echo 21 will go through low gain amplifier 15 of Fig. 1 and will yield output A. Land echo 21 will saturate high gain amplifier 14 of Fig. 1 and will yield output B, which when added to A yields C, the composite amplitude. This level of output signal is seen to produce a gray tone on the radar scope. City echo 22, on the other hand, saturates low gain amplifier 15 of Fig. 1, as well as high gain amplifier 14 of Fig. 1, and produces a composite amplitude which is seen to be in the white region. The use of two such amplifiers in the described configuration is thus seen to provide a composite characteristic which has effectively two levels of limiting action. This limiting action takes place in the high gain amplifier for signals of lower amplitude and produces saturated signals which yield a relatively uniform gray tone. The limiting action for larger amplitude target echoes takes place in low gain amplifier 15 of Fig. 1 as well as high gain amplifier 14 of Fig. 1 and in so doing yields a signal intensity which produces a white tone. Target echoes of value less than ground clutter, such as water areas, when impressed on a circuit having the disclosed composite characteristic, will not be of sufficient strength to reach the gray tone area, and as a consequence will provide the third or black tone.

Thus by adjustment of the tap of variable resistor 17 in Fig. 1, any local condition may be readily accommodated and an effective three-tone presentation may be made to appear on any intensity modulated cathode ray tube. As is apparent to those skilled in the art, amplifier tube 15 with cathode degeneration could be replaced by a remote cut-off tube and the same results obtained. This invention is seen to be simpler in construction, design, application and use than those disclosed in the copending applications of Rubby Sherr for an Electrical Circuit, Serial No. 608,306, filed August 1, 1945, and of Stanley N. Van Voorhis for an Indicator, Serial No. 631,756, filed Nov. 29, 1945, which are of similar nature.

This invention is only to be limited by the appended claims.

What is claimed is:

1. An electrical circuit comprising, first and second limiting pentode amplifiers, means for coupling input signals to be limited to the control grids of said amplifiers, a common impedance coupling the plates of said pentodes to a source of positive potential, means for operating said first pentode limiting amplifier at zero bias, an unbypassed resistor in circuit with the cathode of said second amplifier providing degenerative feedback for said second amplifier, the control grid of said second amplifier being coupled to a tap on said resistor, the output of said circuit being taken from the plates of said amplifiers, whereby said limiting amplifiers provide a composite characteristic having two effective levels of limiting.

2. In a limiter circuit a first electron tube limiter comprising a high gain, substantially unbiased, amplifier arranged for saturation at a relatively low input signal level, a second electron tube limiter comprising a low gain amplifier, said low gain amplifier having a variable bias and degenerative feedback and arranged for saturation at a relatively high input signal level, means for applying input signals to said first and second limiters in parallel and means for additively combining the output signals of said first and second limiters.

References Cited in the file of this patent

UNITED STATES PATENTS

| | | |
|---|---|---|
| 1,705,993 | Oswald | Mar. 19, 1929 |
| 1,711,658 | Sprague | May 7, 1929 |
| 2,066,284 | Ballantine | Dec. 29, 1936 |
| 2,144,304 | Braden | Jan. 17, 1939 |
| 2,248,563 | Hanns-Heinz Wolff | July 8, 1941 |
| 2,300,189 | Wolff | Oct. 27, 1942 |
| 2,406,882 | Young | Sept. 3, 1946 |